2,906,589

DYEING AND PRINTING OF POLYMERS OF ACYRLONITRILE

Werner Müller, Koln, and Hubertus Psaar, Koln-Bickendorf, Germany, assignors to Farbenfabriken Bayer Aktiengesellschaft, Leverkusen, Germany, a corporation of Germany No Drawing. Application February 20, 1957
Serial No. 641,250

Claims priority, application Germany March 1, 1956

3 Claims. (Cl. 8—55)

The present invention relates to the dyeing and printing of polymers of acrylonitrile; more particularly it relates to a process for dyeing and printing articles comprising acrylonitrile polymers with oxazine dyestuffs of the general formula

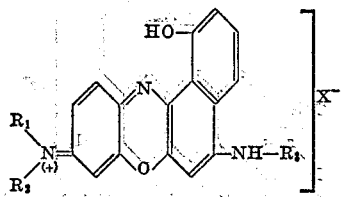

wherein $R_1$ means hydrogen, alkyl or substituted alkyl, $R_2$ stands for alkyl, substituted alkyl, aryl or aralkyl, $R_3$ means hydrogen or a —$CH_2$—$CH_2$—$CH_2$— or

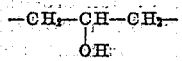

group linked to the aromatic nucleus in o-position to —NH—, and X stands for an acid radical.

As articles comprising acrylonitrile polymers there may be mentioned fibres, filaments, fabrics, moulded articles and the like. Also acrylonitrile copolymers containing at least 85% by weight of acrylonitrile can be dyed according to the invention.

It is an object of this invention to provide a process for dyeing and printing articles prepared from acrylonitrile polymers containing at least 85% by weight of acrylonitrile. A further object is the provision of dyed and printed acrylonitrile polymers and copolymers, the dyeings and prints obtained being distinguished by good fastness properties.

According to the invention it has been found that valuable dyeings and prints may be obtained on polymers or copolymers of acrylonitrile by using oxazine dyestuffs of the general formula

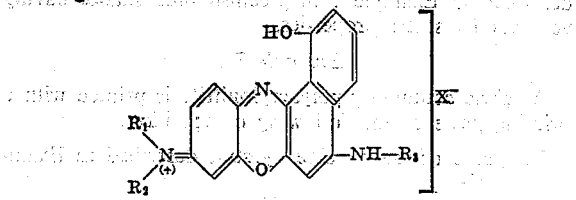

wherein $R_1$ means hydrogen, alkyl or substituted alkyl, $R_2$ stands for alkyl, substituted alkyl, aryl or aralkyl, $R_3$ means hydrogen or a —$CH_2$—$CH_2$—$CH_2$— or

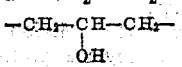

group linked to the aromatic nucleus in o-position to —NH—, and X stands for an acid radical. The aromatic radicals of the oxazine dyestuffs may contain further substituents.

The dyestuffs used according to the invention may be produced by known methods, for example by the reaction of 4-nitroso-3-hydroxy-aminobenzenes with 1-amino-5-hydroxynaphthalene, 7-hydroxy-1,2,3,4-tetrahydrobenzoquinoline, or py-3-hydroxy-1,2,3,4-tetrahydro-7-hydroxy-benzoquinoline in acid medium. They may, however, also be produced by the process disclosed in German patent specifications 49,844; 77,885 or 87,133 by reaction of 4-amino-2-hydroxy-azobenzenes with 1-amino-5-hydroxynaphthalenes.

Suitable components for the production of the dyestuffs are for example 4-nitroso-3-hydroxy-N-dimethyl-aniline, 4-nitroso-3-hydroxy-N-diethylaniline, 4-nitroso-3-hydroxy-N-ethyl-N-hydroxyethyl-aniline, 4-nitroso-3-hydroxy-N-methyl-N-chloroethyl-aniline, 4-nitroso-3-hydroxy-N-methyl-N-cyanethyl-aniline, 4-nitroso-3-hydroxy-N,N-dihydroxyethyl-aniline, 4-nitroso-3-hydroxy-N,N-dichloroethyl-aniline, 4-nitroso-3-hydroxy-N,N-dicyanethyl-aniline, 4-nitroso-3-hydroxy-2-chloro-N-methylaniline, 4-nitroso-3-hydroxy-5-methyl-N,N-dimethylaniline, 4-nitroso-3,6-dihydroxy-N,N-dimethyl-aniline, 4-nitroso-3-hydroxy-4'-methyl-N-methyl-diphenylamine, 4-dimethylamino-2-hydroxy-azobenzene, 4-dimethylamino-2-hydroxy-azobenzene-4'-sulfonic acid, 1-amino-5-hydroxynaphthalene, 7-hydroxy-1,2,3,4-tetrahydrobenzoquinoline, py-3-hydroxy-1,2,3,4-tetrahydro-7-hydroxybenzoquinoline.

For the formaiton of salts according to the general definition the following acids are suitable for example: hydrohalic acid, sulfuric acid, phosphoric acid, aminosulfonic acid, formic acid, acetic acid, propionic acid, chloracetic acid and oxalic acid.

The 1,2,3,4-tetrahydro-benzoquinoline derivatives are easily obtainable by the action of epichlorhydrin upon 1-amino-5-hydroxynaphthalene and subsequent ring closure according to the process disclosed in German patent specification 634.035, or by alkali melt of tetrahydrobenzoquinoline-7-sulfonic acid according to German patent specification 642,558.

The dyeing of polyacrylonitrile fibres with the oxazine dyestuffs according to the invention is carried out in conventional manner from an aqueous solution with the addition of acid such as acetic acid, formic acid, or sulfuric acid. In some cases, it is an advantage to use a dispersing agent, for example a polyglycol ether of a high molecular weight fatty alcohol, or soap. The instructions given for the dyeing apply in principle also to the printing of polyacrylonitrile fibres.

The dyeings obtainable in this way have very good fastness properties. The excellent fastness to light should be especially noted. The dyeings obtainable according to the process of the invention differ therein in an advantageous manner from the dyeings obtained by the process of French patent specification 1,099,280.

The following examples are given for the purpose of illustrating the invention without, however, limiting it thereto.

Example 1

20 grams of the hydrochloride of 1-amino-5-hydroxynaphthalene and 31 grams of the hydrochloride of 4-nitroso-3-hydroxy-1-dimethylaminobenzene in 100 grams of glacial acetic acid and 20 grams of water are refluxed for 2 hours. The contents of the flask are then poured into 300 grams of ice water, and the oxazine dyestuff thus obtained is salted out with a 20 percent solution of common salt. It corresponds to the formula

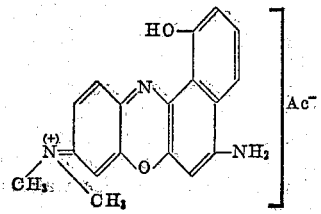

Polyacrylonitrile fibres are dyed using a liquid-to-goods ratio of 50:1 with addition of 3 percent of 30% acetic acid and 1.5 percent of sodium acetate. For this purpose, the fibre is introduced into the dyebath at 40° C., the temperature of the bath raised to 100° C. within a half hour and the dyeing effected at boiling temperature for 1 hour.

Bluish green dyeings are obtained of good fastness properties, especially of very good fastness to light.

Example 2

8.6 grams of the hydrochloride of 1,2,3,4-tetrahydro-3-hydroxy-(7,8,1',2') - 6' - hydroxy - benzoquinoline in 50 grams of glacial acetic acid are heated to the boil with stirring. 10.8 grams of the hydrochloride of 4-nitroso-3-hydroxy-1-diethylamino-benzene in 50 grams of glacial acetic acid are then added to the solution and the mixture is boiled for 10 minutes. The mixture is then poured into 250 grams of ice water and the dyestuff salted out with common salt. It corresponds to the formula

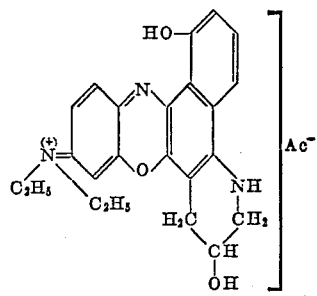

The dyestuff is dyed on polyacrylonitrile fibres according to the instruction given in Example 1 whereby bluish green shades are obtained which are very fast to light.

Example 3

12.5 grams of the hydrochloride of 1,2,3,4-tetrahydro-3-hydroxy-(7,8,1',2') - 6' - hydroxybenzoquinoline and 16 grams of the hydrochloride of 4-nitroso-3-hydroxy-1-(N-ethyl-N-hydroxyethyl)-aniline in 50 grams of glacial acetic acid are refluxed for 10 minutes. The mixture is then poured into 250 grams of ice water and the dyestuff salted out with common salt. It corresponds to the formula:

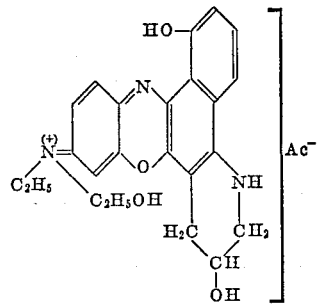

The dyestuff is dyed on polyacrylonitrile fibres according to the instructions given in Example 1 whereby bluish green shades are obtained having very good fastness to light.

Example 4

24 grams of 3-hydroxy-(N-ethyl-N-chloroethyl)-aniline are dissolved in 125 grams of glacial acetic acid and treated at 0–5° C. with 8.5 grams of sodium nitrite in 20 grams of water. After reaction is completed thereto are added 18 grams of the hydrochloride of 1-amino-5-hydroxy-naphthalene and the mixture is refluxed with stirring for 15 minutes. The contents of the flask are then poured into 500 grams of ice water and the dyestuff is precipitated with the addition of sodium chloride solution. It corresponds to the formula

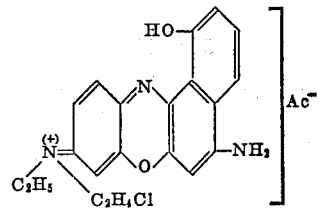

and dyes polyacrylonitrile fibres with the addition of a dispersing agent in reddish blue shades.

Example 5

37 grams of the hydrochloride of 4-nitroso-3-hydroxy-(N-methyl-N-cyanethyl)-aniline and 16 grams of 1-amino-5-hydroxy-naphthalene are refluxed in 100 grams of glacial acetic acid for 30 minutes. The mixture is then poured into 300 grams of ice water and the dyestuff is isolated by adding sodium chloride solution. The dyestuff which corresponds to the following formula:

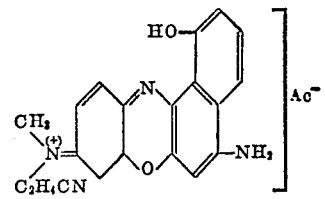

dyes polyacrylonitrile fibres in reddish blue shades.

Example 6

20 grams of 1,2,3,4-tetrahydro-7-hydroxy-benzoquinoline and 28 grams of the hydrochloride of 4-nitroso-3-hydroxy-1-dimethylaminobenzene are refluxed in 100 grams of glacial acetic acid and 20 grams of water for 1 hour. The contents of the flask are then poured into 300 grams of ice water and the oxazine dyestuff is precipitated with the addition of sodium chloride solution. The dyestuff thus obtained corresponds to the formula

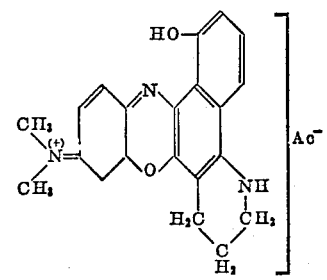

It dyes polyacrylonitrile fibres according to the method described in Example 1 in greenish blue shades having very good fastness properties.

Example 7

A fabric containing polyacrylonitrile is printed with a printing paste of the following composition:

- 30 grams of the oxazine dyestuff described in Example 1,
- 30 grams of acetic acid (30 percent),
- 500 grams of crystal gum (gum arabic used as thickener),
- 360 grams of water,
- 30 grams of zinc nitrate solution (d 1.5),
- 50 grams of thiodiethylene glycol.

1000 grams

The print thus obtained is dried, steamed for 30 minutes and subsequently rinsed with water. A bluish green print is obtained having very good fastness properties, especially very good fastness to light.

We claim:
1. An oxazine dyestuff corresponding to the formula

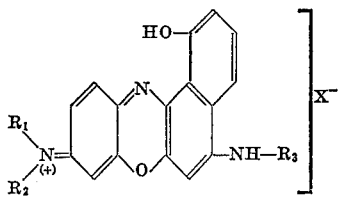

wherein $R_1$ means a radical selected from the group consisting of hydrogen, alkyl and substituted alkyl, $R_2$ stands for a member selected from the group consisting of alkyl, substituted alkyl, aralkyl and aryl, $R_3$ means a radical selected from the group consisting of hydrogen, and a —$CH_2$—$CH_2$—$CH_2$— and

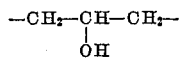

group linked to the aromatic nucleus in o-position to —NH—, and X stands for an acid radical selected from the group consisting of hydrohalic acid, sulfuric acid, phosphoric acid, amino sulfonic acid, formic acid, acetic acid, propionic acid, cloroacetic acid and oxalic acid.

2. Articles prepared from acrylonitrile polymers containing at least 85% by weight of acrylonitrile, said articles being dyed with oxazine dyestuffs corresponding to the formula

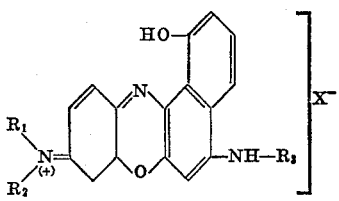

wherein $R_1$ means a radical selected from the group consisting of hydrogen, alkyl and substituted alkyl, $R_2$ stands for a member selected from the group consisting of alkyl, substituted alkyl, aralkyl and aryl, $R_3$ means a radical selected from the group consisting of hydrogen, and a —$CH_2$—$CH_2$—$CH_2$— and

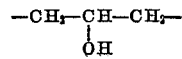

group linked to the aromatic nucleus in o-position to —NH—, and X stands for a radical of an acid selected from the group consisting of hydrohalic acid, sulfuric acid, phosphoric acid, aminosulfonic acid, formic acid, acetic acid, propionic acid, chloroacetic acid, and oxalic acid.

3. Articles prepared from acrylonitrile polymers containing at least 85% by weight of acrylonitrile, said articles being printed with oxazine dyestuffs corresponding to the formula

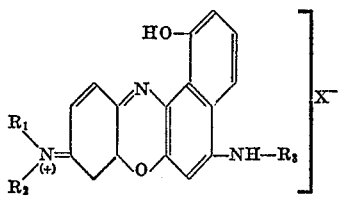

wherein $R_1$ means a radical selected from the group consisting of hydrogen, alkyl and substituted alkyl, $R_2$ stands for a member selected from the group consisting of alkyl, substituted alkyl, aralkyl and aryl, $R_3$ means a radical selected from the group consisting of hydrogen, and a —$CH_2$—$CH_2$—$CH_2$— and

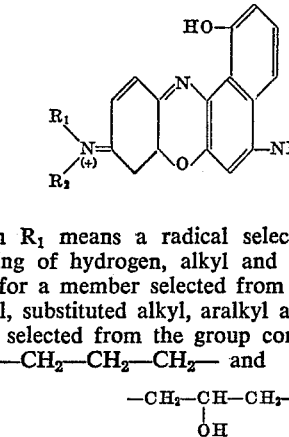

group linked to the aromatic nucleus in o-position to —NH—, and X stands for a radical of an acid selected from the group consisting of hydrohalic acid, sulfuric acid, phosphoric acid, aminosulfonic acid, formic acid, acetic acid, propionic acid, chloroacetic acid, and oxalic acid.

References Cited in the file of this patent
FOREIGN PATENTS

| | | |
|---|---|---|
| 1,099,280 | France | Sept. 1, 1955 |
| 751,150 | Great Britain | June 27, 1956 |

OTHER REFERENCES

Chem. and Eng. News for September 10, 1956, p. 4359 (art. by Schroeder).

The J. of the Soc. of Dyers and Colourists for June 1956, p. 263 (art. by Walls).